UNITED STATES PATENT OFFICE.

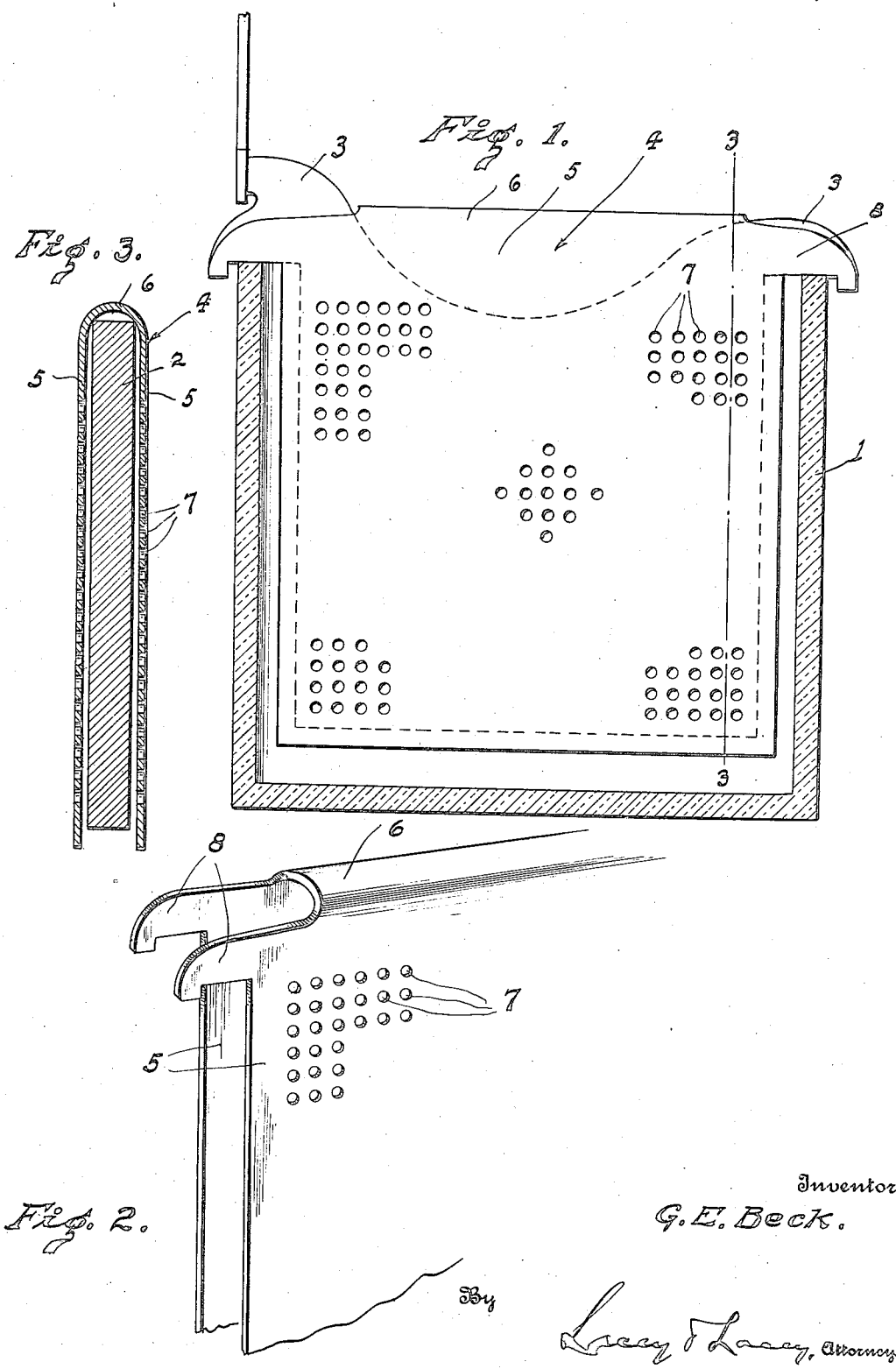

GEORGE E. BECK, OF CLEVELAND, OHIO.

SEPARATOR FOR STORAGE-BATTERY PLATES.

1,422,815.  Specification of Letters Patent.  Patented July 18, 1922.

Application filed December 17, 1920. Serial No. 431,420.

*To all whom it may concern:*

Be it known that I, GEORGE E. BECK, a citizen of the United States, residing at Cleveland, in the county of Cuyahoga and State of Ohio, have invented certain new and useful Improvements in Separators for Storage-Battery Plates, of which the following is a specification.

This invention relates to improvements in storage batteries and more particularly to an improved means for separating and mutually insulating the plates of such a battery, and one of the primary objects of the invention is to provide a separator which will effectually maintain the battery plates in suitably spaced relation so as to avoid all likelihood of internal short circuiting and which will yet not interfere in any way with the reaction which takes place within the battery.

Another object of the invention is to provide a battery plate separator which may be readily disposed in place and removed whenever required and which will not require to be directly attached or connected to the plate which it is to insulate and which will in fact be free from any bonding connection with said plate.

Another object of the invention is to provide a battery plate separator so constructed that it will serve not only to space and relatively insulate the body portions of the several plates of the battery but also to similarly protect the supporting lugs for the plates from contact with one another and thus further provide against short circuiting.

The invention also has as one of its objects to so construct the separator that it will not obstruct the sediment space at he bottom of the battery cell nor influence the collection of sediment in such a manner as to cause internal short circuiting of the battery.

Still another object of the invention is to provide a separator which will not be liable to become disarranged after being properly placed in position and which will not be subject to deterioration nor liable to in any way decrease the efficiency of the electrolyte.

In the accompanying drawing:

Figure 1 is a side elevation of the battery plate separator embodying the invention applied to one of the plates of a storage battery which plate is shown in elevation, the battery cell being shown in section;

Figure 2 is a perspective view of one upper corner of the separator detached;

Figure 3 is a vertical transverse sectional view taken substantialy on the line 3—3 of Figure 1.

In the drawing, the numeral 1 indicates the glass jar of an ordinary storage battery, and the numeral 2 indicates the battery plates which are provided with the usual lugs 3 at their upper corners to rest upon the upper edges of the opposite side walls of the jar 1 for the purpose of suspending the plates within the jar and in the electrolyte.

The separator embodying the present invention is indicated in general by the numeral 4 and this separator may be formed from a sheet of any suitable material such as hard rubber, which is a non-conductor of electricity, light in weight, and not affected by the electrolyte. The said separator comprises spaced side portions 5 and a connecting portion 6 which extends between the upper edges of the said side portions and is preferably formed by folding medially the sheet of material from which the separator is formed. The side portions 5 are of substantially rectangular form and each is of dimensions slightly greater than that of the battery plate with which the separator is to be assembled so that the side and lower margins of the said members 5 will project slightly beyond the corresponding margins of the battery plate as clearly shown in Figures 1 and 3 of the drawings, the side members 5 thus protecting and effectually covering the opposite side faces of the said battery plate. However the side members 5 of the protector are formed each with a considerable number of perforations 7 which permit of the free circulation of the electrolyte so that the reaction which takes place within the cell is not interfered with by reason of the presence of the separators. The connecting portion 6 of each separator may be transversely arched or rounded as illustrated in Figures 2 and 3 of the drawing, or of any other desired contour, and this portion is designed to extend over but not necessarily in contact with the upper edge of the battery plate 2 with which the separator is assembled. In other words the separator embodying the invention is designed to be positioned straddling the plate in connection with which it is used, and in order that the separator may be supported entirely independently of the plate, the side portions 5 of the separator are formed at their upper corners with lugs 8 which rest upon the upper edges of the side walls of the jar 1. Therefore the separator is supported upon the walls of the jar rather than upon the plate which it is to protect.

It will be understood that one of the separators is to be employed in connection with each plate of the battery so that between every two adjacent plates of the battery there will be located two of the side members 5 side by side. In this manner the battery plates are effectually held out of contact and suitably spaced and mutually insulated, and yet the means provided for accomplishing this result does not in any way interfere with the reaction which takes place within the cell.

Having thus described the invention, what is claimed as new is:

1. A battery plate separator formed to straddle a plate to be protected, and provided at its upper corners with suspension means for engagement with the rim of a battery jar.

2. A battery plate separator formed to straddle a plate to be protected and comprising side portions having an area at least equal to that of the side faces of the plate to be protected, the said side portions being perforate, and means upon the separator for engagement with the rim of a battery jar to suspend the said separator independently of the battery plate.

3. A battery plate separator comprising spaced side members and a connecting upper portion, the side members being provided at their upper corner portions with outwardly projecting supporting lugs for disposal upon the rim of a battery jar.

4. A battery plate separator comprising spaced side members and a connecting upper portion to span the plate to be protected, the side members being of an area at least equal to the area of the side faces of the plate to be protected and being perforate, and lugs projecting outwardly from the upper corner portions of the side members for engagement with the rim of a battery jar.

5. The combination with a battery jar, and a battery plate suspended on the upper edges of the jar, of a separator of non-conductive material and consisting of perforated side members adapted to fit within the jar at the opposite sides of the battery plate and extend over the entire side area of the battery plate, a longitudinal arched portion connecting the upper ends of the side members and bridging the battery plate, and lugs projecting from the upper corners of the side members to engage over the edges of the battery jar and suspend the separator on the jar independently of the battery plate.

In testimony whereof I affix my signature.

GEORGE E. BECK. [L. S.]